(12) United States Patent  
Gishen

(10) Patent No.: US 8,909,475 B2
(45) Date of Patent: Dec. 9, 2014

(54) GENERATING TRANSPORT ROUTES USING PUBLIC AND PRIVATE MODES

(71) Applicant: Zzzoom, LLC, Boca Raton, FL (US)

(72) Inventor: Kayle Gishen, Boca Raton, FL (US)

(73) Assignee: Zzzoom, LLC, Boca Raton, FL (US)

( * ) Notice: Subject to any disclaimer, the term of this patent is extended or adjusted under 35 U.S.C. 154(b) by 0 days.

(21) Appl. No.: 13/790,467

(22) Filed: Mar. 8, 2013

(65) Prior Publication Data

US 2014/0257697 A1 Sep. 11, 2014

(51) Int. Cl.
*G01C 21/00* (2006.01)
*G01C 21/34* (2006.01)

(52) U.S. Cl.
CPC ............ *G01C 21/00* (2013.01); *G01C 21/3423* (2013.01); *G01C 21/3438* (2013.01); *G01C 21/34* (2013.01)
USPC ............................ 701/537; 701/540; 701/541

(58) Field of Classification Search
CPC .................................. G06F 15/16; G06F 17/00
USPC ................. 705/14.58; 707/999.004; 709/204; 701/300, 302, 410, 467, 526, 527, 532, 701/533, 537–541
See application file for complete search history.

(56) References Cited

U.S. PATENT DOCUMENTS

| | | | |
|---|---|---|---|
| 6,477,515 B1 * | 11/2002 | Boroujerdi et al. | 706/14 |
| 6,868,320 B1 * | 3/2005 | Burch | 701/467 |
| 6,892,939 B2 | 5/2005 | Silver et al. | |
| 7,840,427 B2 * | 11/2010 | O'Sullivan | 705/6 |
| 7,844,481 B2 | 11/2010 | Hilbush et al. | |
| 7,983,991 B2 | 7/2011 | Crussol | |
| 8,170,790 B2 * | 5/2012 | Lee et al. | 701/400 |
| 8,731,835 B2 * | 5/2014 | Chidlovskii et al. | 701/540 |
| 2005/0091154 A1 | 4/2005 | Yokoyama et al. | |
| 2007/0162761 A1 | 7/2007 | Davis et al. | |
| 2008/0059061 A1 * | 3/2008 | Lee | 701/209 |
| 2008/0077309 A1 * | 3/2008 | Cobbold | 701/117 |
| 2008/0121682 A1 | 5/2008 | Grim et al. | |

(Continued)

FOREIGN PATENT DOCUMENTS

WO 2011054710 A1 5/2011

OTHER PUBLICATIONS

Web-site www.shareride.com—US and Canadian Rideshare Board, © 1999-2008, 1 page—retrieved Mar. 8, 2013.

(Continued)

*Primary Examiner* — Thomas Tarcza
*Assistant Examiner* — Tyler J Lee
(74) *Attorney, Agent, or Firm* — Fleit Gibbons Gutman Bongini & Bianco PL; Gary S. Winer; Paul D. Bianco

(57) ABSTRACT

A system for planning transportation for a passenger along a route from an origin to a destination includes software which stores information pertaining to the passenger's desired route, one or more public transportation options, and one or more drivers willing to transport the passenger, using a private vehicle, along at least a portion of the route. Drivers bids for transporting the passenger are obtained using crowdsourcing. The public transportation information and driver information are used to calculate one or more combinations of private legs and public legs using a graph search algorithm and the heuristic formula $w = nt_p(+^*)(t_m)^x$, where n and x are constant, $x<1$, and $t_p$, $t_m$ are time waiting and time moving, respectively.

20 Claims, 3 Drawing Sheets

(56) References Cited

U.S. PATENT DOCUMENTS

| | | |
|---|---|---|
| 2008/0270204 A1* | 10/2008 | Poykko et al. .................... 705/7 |
| 2009/0119001 A1* | 5/2009 | Moussaeiff et al. .......... 701/200 |
| 2011/0022304 A1* | 1/2011 | Lee .............................. 701/201 |
| 2012/0265578 A1 | 10/2012 | Olding et al. |
| 2012/0290652 A1* | 11/2012 | Boskovic ...................... 709/204 |
| 2013/0046456 A1* | 2/2013 | Scofield et al. ............... 701/117 |
| 2013/0095460 A1 | 4/2013 | Bishop |
| 2013/0179065 A1* | 7/2013 | Cobbold ....................... 701/410 |
| 2013/0183952 A1 | 7/2013 | Davis et al. |
| 2013/0262222 A1* | 10/2013 | Gibson et al. .............. 705/14.49 |
| 2013/0297207 A1* | 11/2013 | Mason et al. ................. 701/533 |
| 2013/0317747 A1* | 11/2013 | Chidlovskii et al. .......... 701/540 |
| 2014/0005934 A1* | 1/2014 | Chia et al. .................... 701/450 |
| 2014/0062790 A1* | 3/2014 | Letz et al. .................... 342/386 |

OTHER PUBLICATIONS

Web-site www.zimride.com—Ridesharing, Carpooling and Buses—Grab a Seat © 2013, 1 page—retrieved Mar. 8, 2013.

* cited by examiner

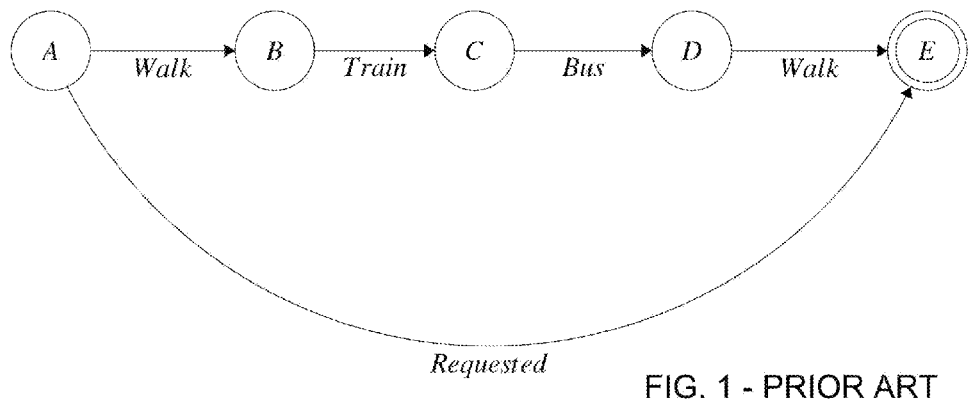
FIG. 1 - PRIOR ART
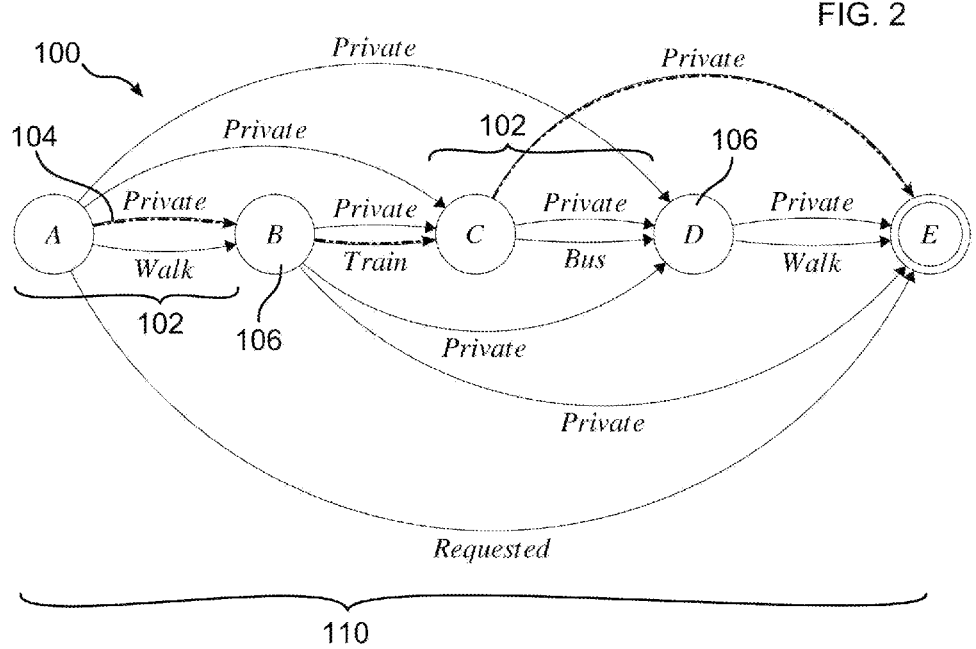
FIG. 2

GENERATING TRANSPORT ROUTES USING PUBLIC AND PRIVATE MODES

FIELD OF THE INVENTION

The invention relates to a system and method for determining transportation routes using various transport modes, and more particularly to generating routes using volunteered private transport combined with public transport.

BACKGROUND OF THE INVENTION

To use public mass transit, such as buses, trains, planes, ferries, and the like, one consults a list of stops for each of the various modes of transport. The list may additionally provide information pertaining to the route length, the number of stops, and other details regarding the transportation mode.

To use private transport, such as walking or using a vehicle under one's control, one can use a GPS device, or consult a map to plan one's own route.

SUMMARY OF THE INVENTION

In accordance with the disclosure, a system for planning transportation for a passenger along a route from an origin to a destination, comprises using at least one computer executing software stored on non-transitory media, the software configured for—storing information pertaining to the passenger, including a desired route; storing information pertaining to one or more public transportation options which can be used by the passenger to travel along at least a portion of the route along one or more public legs, each public leg having a starting and ending location; storing information pertaining to one or more drivers willing to transport the passenger, using a private vehicle, along at least a portion of the route along one or more private legs, each private leg having a starting and ending location; using stored public transportation information and driver information to calculate one or more combinations of private legs with public legs, the combination including at least one of (a) one or more private legs beginning at one or more public leg ending locations and (b) one or more private legs ending at one or more public leg starting locations; and communicating the calculated combinations to the passenger.

In various embodiments thereof, calculating one or more combinations uses the formula $w=nt_p(+^*)(t_m)^x$ where n and x are constant, $x<1$, and $t_p$, $t_m$ are time waiting and time moving, respectively; stored information pertaining to the passenger, and information pertaining to drivers, is input using at least one of a web browser and a smartphone application; information pertaining to one or more drivers is obtained using crowd-sourcing; calculating one or more .combinations uses an A* style methodology and heuristics including the formula $w=nt_p(+^*)(t_m)^x$; and information pertaining to public transportation options is filtered to select for options having at least one of a relatively shorter distance and a relatively shorter travel time than options not selected.

In other embodiments thereof, calculating is performed using a graph methodology where an original edge, corresponding to a public or private leg, is replaceable, and where the graph remains monotonic, directed, and acyclic when new edges are inserted; calculating uses a graph search algorithm to select a first subset of optimal routes having at least one of least edges traversed, least time traveling, and least cost, relative to all possible routes; a second subset is selected from the first subset using the graph search algorithm; and when the second subset is rejected by the passenger, or is suboptimal in accordance with predetermined criteria, the first subset is recalculated using public transportation options not included when calculating the first subset.

In another embodiment of the disclosure, a system for planning transportation for a passenger along a route from an origin to a destination, comprises using at least one computer executing software stored on non-transitory media, the software configured for—storing information pertaining to the passenger, including a desired route provided by the passenger using a natural language format; processing the natural language route information, to determine the desired route, using a variable context compiler which parses L1 to LN grammars simultaneously, and which uses a sliding window filter and a cascade architecture; storing information pertaining to one or more public transportation options which can be used by the passenger to travel along at least a portion of the route along one or more public legs, each public leg having a starting and ending location; storing information pertaining to one or more drivers willing to transport the passenger, using a private vehicle, along at least a portion of the route along one or more private legs, each private leg having a starting and ending location; using stored public transportation information and driver information to calculate one or more combinations of private legs with public legs, the combination including at least one of (a) one or more private legs beginning at one or more public leg ending locations and (b) one or more private legs ending at one or more public leg starting locations; and communicating the calculated combinations to the passenger.

In various embodiments thereof, the variable context compiler separates the natural language route information into string groups separated by a keyword, and processes each string group separately; a rule set of the variable context compiler is configured to analyze a plurality of different grammatical contexts of natural language route information; calculating one or more combinations uses the formula $w=nt_p(+^*)(t_m)^x$ where n and x are constant, $x<1$, and $t_p$, $t_m$ are time waiting and time moving, respectively; stored information pertaining to the passenger, and information pertaining to drivers, is input using at least one of a web browser and a smartphone application; information pertaining to one or more drivers is obtained using crowd-sourcing; and calculating one or more .combinations uses an A* style methodology and heuristics including the formula $w=nt_p(+^*)(t_m)^x$.

In a yet further embodiment, a system for planning transportation for a passenger along a route from an origin to a destination, comprises using at least one computer executing software stored on non-transitory media, the software configured for—storing information pertaining to the passenger, including a desired route; storing information pertaining to one or more public transportation options which can be used by the passenger to travel along at least a portion of the route along one or more public legs, each public leg having a starting and ending location; storing information pertaining to one or more drivers willing to transport the passenger, using a private vehicle, along at least a portion of the route along one or more private legs, each private leg having a starting and ending location, the information obtained by crowd-sourcing; using stored public transportation information and driver information to calculate one or more combinations of private legs with public legs using a graph search algorithm and the heuristic formula $w=nt_p(+^*)(t_m)^x$, where n and x are constant, $x<1$, and $t_p$, $t_m$ are time waiting and time moving, respectively, the combination including at least one of (a) one or more private legs beginning at one or more public leg ending locations and (b) one or more private legs ending at one or more public leg starting locations; and communicating the calculated combinations to the passenger.

In various embodiments thereof, crowd-sourcing includes drivers submitting bids to transport the passenger along one or more of the private legs; and passengers submit bids to obtain transportation along one or more private legs.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 1 is a graph depicting a typical public transit route of the PRIOR ART;

FIG. 2 depicts an ideal fully connected graph representing all possible routes when integrating public and private transit in accordance with the disclosure;

DETAILED DESCRIPTION OF THE INVENTION

Figure 3:
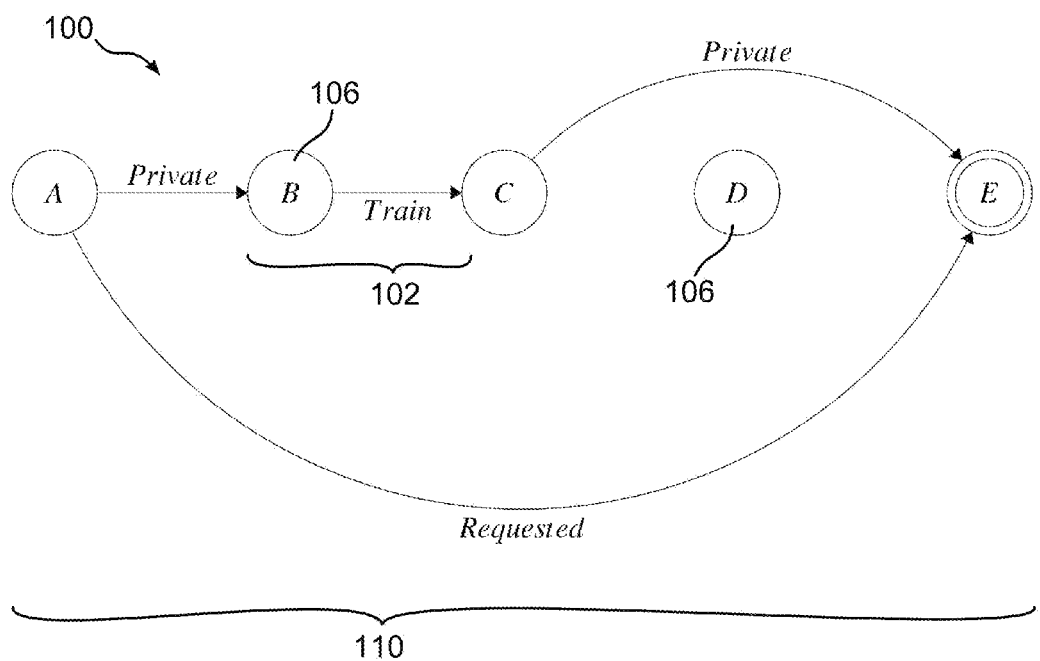
FIG. 3 depicts a least transfers route using the system of the disclosure.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically.

Public transit includes all manner of transportation for one or more people where the people would not normally decide the route, time of departure, and many other aspects of the trip. Often, public transport is controlled by a government or quasi-government entity. Private transit includes walking and using vehicles whose departure time and route are under the control of the people traveling. Additionally, private transportation is not generally made available to all who wish to use it, whereas public transportation is generally available to all.

More specifically, private transit tends to exclude passengers who cannot afford the use or ownership of a private vehicle, particularly where the journey is far. While public transit is affordable for most passengers, the network availability, or the selection of routes and times is necessarily limited, and does not adequately provide for the needs of all who wish to travel inexpensively.

In accordance with the disclosure, public transit resources, or the public transit grid, is combined with private transportation to provide a more complete set of options for passengers wishing to obtain the flexibility of private transportation at a cost much closer to the cost of public transportation, or less than private transportation alone, particularly in consideration of the cost of ownership of a private transport vehicle.

Further in accordance with the disclosure, passengers are provided with a set of route instructions which includes information pertaining to available public transport, as well as private transport that is made available through the use of a system 100 of the disclosure. In this manner, a greater extent of route coverage is made available, as well as more flexible timing affordable. Further, by making private transportation more generally available, a quasi-public transportation network is created with far greater coverage and flexibility than a conventional public transportation network.

System 100 of the disclosure creates a mixed mode transit wherein a passenger can travel using both private and public transit to achieve a better traveling experience. System 100 provides one or a plurality of routes for a passenger optimized for the least time, the least transfers, and possibly the least cost. System 100 integrated a public transit route with multiple private transit options using a graph search function of the disclosure. The search uses tiered path planning to offer routes determined to be optimal by the heuristic of the disclosure that is used to determine the optimal path.

With reference to FIG. 1, a typical prior art public transit route is represented as a graph where each node is a point along the route (A-E), the nodes are joined by connecting arrows representing various forms of travel, including 'Walk', 'Train', and 'Bus'. A travel leg 102 includes a node or waypoint 106 and an arrow extending to the next waypoint 106. A route is a series of one or more legs 102. An example route 104 is illustrated as a dashed line, in FIG. 2. A series of possible routes to a destination is a map, or result set 110.

In accordance with the disclosure, in view of a graph methodology, an original edge, corresponding to a public or private leg, is replaceable, and the graph remains monotonic, directed, and acyclic when new edges are inserted. More particularly, monotonic pertains to enforcing that the path between any two nodes is always moving the user closer to their destination. A replaceable edge is one where the filter is satisfied, and will generally be a long duration edge. A non-replaceable edge is one where a shorter duration replacement is not likely, for example a subway transfer, where the waiting time is generally short and the travel time is also short.

In accordance with the disclosure, and with reference to FIG. 2, system 100 integrates edges or legs 102, into an optimized result set 110 comprising a plurality of routes 104. A route 104 is any combination of legs 102 which advances the passenger from an origin, depicted in FIG. 2 as waypoint "A", to a destination ,depicted as waypoint "E"). Legs 102 are filtered by a filter 108, based on a $\Delta_t$ and $\Delta_x$, representing a change in duration and distance, respectively, each factor limited by a threshold waiting time value. Filtering is used to foster the selection of transfers, or changes in transport mode at waypoints 106, when required, that are simple or uncomplicated for a passenger to carry out, such as a subway transfer within a city, while optimizing the route set 110 as a whole. More particularly, where a simple transfer can be used, one or more relatively more complex transfers can be discarded, reducing the size of the total set of possible legs.

It should be understood that system 100 comprises one or more computers 1000 (FIG. 4) executing software stored on non-transitory media. The calculation of routes combining all modes available, including public and private transport nodes, is understood to be impossible for humans to do in real time, as passengers stand by for an initial set of routes, or for the calculation of route changes during trips. This is particularly true for traveling in cities or between towns and cities, where there are many transport options. Further, as described in additional detail below, private transport is identified by inviting participants controlling private transportation resources to contribute those resources, for example to offer providing rides to passengers. These invitations and contributions are created using the internet, or any other computer based network, and can include using the cellular network and smartphones, in addition to other forms of computing resources. It is contemplated that system 100 performs these calculations, together with invitations for private transport, for the route planning of at least hundreds or thousands of travelers at a given time.

In the instant disclosure, a driver is a person who owns, operates, or controls a private vehicle not normally hired as a taxi or other vehicle principally hired out and licensed chiefly for this purpose. In the context of the instant application, while a driver may make money or obtain other benefits from volunteering their vehicle within system 100, it is generally considered that this is an ancillary purpose for the vehicle, and the vehicle is not principally used as a taxi, limousine, bus, or the like.

Further in accordance with the disclosure, private transportation services from drivers is crowd-sourced using an offer and bid model, in which drivers who have registered with system 100 can volunteer their services to drive passengers, and passengers can bid on the seats made available in this manner. Crowdsourcing as defined in Wikipedia is the practice of obtaining needed services, ideas, or content by soliciting contributions from a large group of people, and especially from an online community, rather than from traditional employees or suppliers. In the context of the instant disclosure, crowdsourcing specifically includes passengers and drivers using system 100 to offer or seek available seats.

Driver's engaged in the use of system 100 can accept a passenger bid if they find any or all of the following to be satisfactory: monetary compensation, departure time, seats required, length of route, passenger identity, including gender and age, and other information. In accordance with a further aspect of the disclosure, drivers are compensated with the transfer of credits purchased in whole or in part by passengers, advertisers, operators of system 100, government agencies, employers, schools, philanthropists, family members, or others. Drivers can convert credits into monetary compensation using system 100. In this manner, passengers and drivers do not need to exchange cash, or use credit cards, increasing the safety of all participants.

In one embodiment, the cost of a ride using private transport is based on its distance. As bids do not have to have the same starting and ending points as an original driver's offer, the bid price may differ from an original offer. In another embodiment, passengers submit requests for rides to system 100, and drivers bid to transport the passengers. In this embodiment, passengers search for transport to a destination using system 100, for example using a website or cellphone application embodying portions of system 100. In response, system 100 provides transport routes that include private, public, and integrated public and private results. A passenger may then make a request to system 100, using the website or application. Drivers, also using the website or application, can then submit bids to provide the private portions of the transport route.

When a passenger or driver specifies a route or destination, they include a time span when the route is needed or available, the number of seats that are need or can be provided, and the beginning and end points desired or available, respectively. This is provided when requesting and offering a bid. When a bid is accepted, the starting and ending points of the route are assigned to the winning bidder. If the route is integrated, the bids are automatically placed for the passenger. If a bid is not accepted by any driver, a route that is entirely public is presented to the passenger.

System 100 receives continuously updated information pertaining to public routes from the public transport providers, and from private services that monitor such public routes. Because the set of all possible public transport routes within a geographic area can be vast, calculating public or integrated routes can be processor intensive and complex, and could not be carried out manually in a sufficiently timely manner to produce a timely and useable result. Further, it is challenging and expensive to carry out the calculations using computer servers in a timely and cost effective manner, as well. Accordingly, in accordance with the disclosure, to reduce processing time and costs, a subset of all public transport possibilities is used in a typical route analysis for a passenger. This subset represents known popular or reliable public routes, the size of the subset targeted to correspond to available processing power and reasonable time constraints, e.g. an amount of time that a passenger or driver will wait for a result. Private transit results may then be correlated with the selected subset by joining graphs in accordance with the disclosure. If there are many private results, these too may be limited by similar criteria, for similar reasons.

FIG. 2 illustrates a result set 110 of possible routes 104, each route 104 comprised of one or more legs 102. The result set 110 may have eliminated some non-simple transfers due to filter 108, and thus the result set does not show all theoretical routes 104. In FIG. 2, the waypoints 106, are the same as depicted in FIG. 1, but in accordance with the disclosure, each waypoint 106 in FIG. 2 is connectable by a set of a plurality of legs, the legs representing the simplest modalities from a passenger's perspective, as clarified by filter 108. FIG. 2 thus integrates a set of travel choices into a single map or result set 110, where each node is connected by at least one theoretically viable transport mode. In subsequent steps, it is determined if each mode is in fact predicted to be available at the required time. This real time availability will likely further reduce the set of available leg choices in subsequent steps.

FIG. 3 shows a possible route. The route is achieved through the use of a graph search algorithm, which can include for example A*, Dijkstra's Algorithm, and Breadth-First Search (BFS) strategies, although other strategies may be used. When searching the 'graph', (herein a map), for possible result set 110 of possible routes, the 'edges' (herein legs 102), between each 'node' (herein stops or transfers) are weighted specifically for the type of leg 102. Weighting is based on factors impacting the relative merits of each leg 102, such factors including, for example, most progress, least transfers, fastest, and least expensive. When determining the least transfers route, the BFS strategy can be used without any edge weighting, as the algorithm will naturally provide an optimal solution.

As can be seen from FIG. 3, six legs 102 of the result set 110 have been removed, leaving route 104, which has been determined to be the most direct and simple route for the passenger. In the case of fastest (least time), the weights could be the time required to complete the leg combined with the amount of time a passenger would be stationary at one point. This may be calculated in accordance with Formula 1 of the disclosure, as follows:

Formula 1

$$w = nt_p(+*)(t_m)^x$$ where n and x are constant, x<1, and $t_p$, $t_m$ are time waiting and time moving, respectively.

Formula 1 emphasizes the time a passenger will be waiting, while simultaneously reducing the weight on movement time. Thus, as long as the passenger is moving, an important optimizing requirement is satisfied, however consideration must also be given to time in motion.

In accordance with an alternative embodiment of the disclosure, x can be a combination of $t_p$, $t_m$, for example tp/tm, in order to satisfy x<1, as opposed to a constant. This change causes the optimization to factor in time waiting versus time traveling, while still optimizing total time.

The foregoing weighting heuristics of the disclosure replace the distance metric generally used in A*. Since each waypoint is at a fixed coordinate, use of the standard implementation of A*, which is Manhattan or Euclidean, would result in the same result as BFS. The use of Formula 1 provides a more accurate and useful result than using Manhattan or Euclidean heuristics.

If at any point a route 104 determined using public or private transit results in a significant waiting period at a public transit node, for example the passenger arrives early with respect to a departure time, a second public transit search can be conducted, and the resultant second public transit graph is tiered, or reintegrated into a new result set of routes for the passenger. The two original public transit graphs can be isolated, yet each joined with the same or different private transit options. The routes found from the initial result set are compared with the new result set. Typically, the second result set is an improvement upon the least time route of the first result set. This tiering integration can continue until all significant pauses in movement are reduced.

Further in accordance with the disclosure, a result set 110 is provided diagrammatically, or routes 104 can be presented as a list of directions, for the passenger. The diagram and or directions enable the user to select from at least one viable route 104. In one embodiment, a passenger can customize a given route 104 by changing a leg 102, for example removing a private leg 102, resulting in presenting the one or more public transportation modes previously determined. For example, a passenger can continue to change one or more legs 102 designated private transport to public transport legs, until a completely public transit route 104 is generated. In another embodiment, a user can request that one or more public transport legs 102 of a route 104 be replaced by private transport. If no simple or efficient private transport legs 102 are available, an inefficient private transport leg 102 could then be substituted.

In accordance with the disclosure, it is thus possible to combine public transportation options which do not form a complete path between an origin and a destination, because the one or more gaps therebetween can be filled by private transport. More particularly, multiple public transit graphs are joined, and new nodes or waypaints are created where there is no overlap. These new waypoints are then connected by private transit. An example process is illustrated in Example 1, which follows.

EXAMPLE 1

Route Generation Process

A passenger seeks transportation from Palo Alto, Calif. to San Francisco, Calif. System 100 analyzes all available private offers starting in Palo Alto and ending in San Francisco, and returns these immediately to the user. The system then analyzes public transit information, generally using a subset of all possibilities that is likely to be satisfactory to a passenger, for example based upon popularity, ratings, or previous selections by this passenger or a set of passengers. Once the routes are identified, the route request input is parsed, and a graph data structure is assembled. For ease of understanding, in the following example only one public transportation route results, consisting of four legs:

1 Walk from Origin in Palo Alto to bus stop A.
2 Take bus B to train station C.
3 Take train D northbound to San Francisco station E.
4 Walk from train station E to the Destination (~10 mins).

Next, system 100 matches available offers from drivers for any of the four nodes, and finds the following result set of two offers:

1 Offer #1: From Origin in Palo Alto to train station C.
2 Offer #2: From train station C in San Francisco to the Destination (~2 mins)

These two offers are added to the graph data structure.

Next, system 100 performs the graph search. Using a standard BFS approach, the least-transfers route is returned:

1 Accept Offer #1 to train station C.
2 Take train D northbound to station E.
3 Either walk or accept Offer #2—due to the nature of BFS, both satisfy the route and either can be chosen. The internal structure of the graph and the BFS algorithm will determine the outcome, which may not be the optimal result for the passenger.

Next, system 100 performs an A* graph search as modified in accordance with the disclosure. The suggested route is as follows:

1 Accept Offer #1
2 Take train D northbound
3 Accept Offer #2

Here we can see that the final leg has a deterministic outcome. Using the modified A* and a simple case where Offer #2 starts as the train arrives, consideration of the duration causes the driving in Offer #2 to be favored, as it is faster than walking.

The two integrated results are transformed back into instructions from the graph structure, with each private leg containing a reference to the public legs it replaced. In the A* case, this would be represented as follows:

1 Accept Offer #1
or (a) Walk to bus stop A,
(b) Take bus B to train station C
2 Take train D northbound to San Francisco station E
3 Accept Offer #2
or (a) Walk to destination These instructions are then sent to the passenger. The passenger can then remove any of the private transit offers, resulting in the original public transit route. Once satisfied with the choices made, the user can save the route. If the route contains private transfer offers, the system then makes all needed private transit bids on behalf of the user. When it is time for the ride to commence, if a private transit bid has not been accepted, or private transfer availability has not otherwise been confirmed, the user will see the corresponding public transit results again.

In accordance with the disclosure, an optimal route satisfies both a predetermined minimum time requirement and a predetermined least transfers requirement simultaneously, or is otherwise acceptable to the passenger. System 100 attempts to find the shortest travel time which requires the least (fewest) transfers. An optimal route may not satisfy a predetermined criteria for absolute least transfers, but may be faster, or conversely may satisfy least transfers, but require a longer travel time.

In an embodiment, a passenger can use a computing device to enter a natural language request, whether typed or spoken.

Natural language processing is carried out by computer 1000 using a variable context compiler 1020 (not illustrated). Compiler 1020 employs a first method which uses certain keywords and keyphrases to determine the meaning of successor text by using grammar rules which are correlated to a position of the keywords and keyphrases within the text. This first method captures specific patterns that are likely to have specific meaning based upon a specific grammatical order.

Compiler 1020 can additionally or alternatively employ a second method in which the order of keywords or keyphrases within the text is not a primary factor for interpretation. By removing a requirement for keywords and keyphrases to occupy a particular position within the text, and by interpreting phrases regardless of a specific grammatical order, a more flexible set of input text may be processed. In an embodiment, the first and second methods are combined, and the results are analyzed together using variable context compilation. This enables greater flexibility in the scope of language which can be understood by system 100.

In one embodiment, compiler 1020 uses a grammar which is more rigid than context free, but not as rigid as a context aware. This is achieved by specifying a tiered grammar that matches as specifically as possible, while simultaneously removing positional constraints. Variable context compiler 1020 parses L1 to LN grammars simultaneously. For example, the presence of a natural date (ex. Saturday) would match an L1 grammar rule to set the date. A modifier could be matched as well (ex. next); however, this would be part of an L2 grammar as the successor could be a day of the week or month. A complex match would be the LN* case. In this there may or may not be a triggering keyword at the beginning of the pattern, but there must be a capturing keyword within or at the end of the pattern. An example would be "from? STRING* to STRING*". In this case the word 'from' is optional, but the word 'to' must be present. To determine the beginning and end of the variable length ranges (STRING*) is where the elimination of the positional constraint is seen. Parser 1020 will match as much as possible, then through other rules remove overlapping and nested matches, as the tiered rules become more specific. In accordance with an embodiment, variable context compiler 1020 includes combining a sliding window filter with cascade architecture, where the cascade modifies the match instead of simple rejection testing.

The foregoing is illustrated with the following example.

EXAMPLE 2

Parsing Natural Language

The following inputs can be typed in, spoken then converted to text, or provided to a server forming a part of system 100 by any other means.

Input 1: "Palo Alto to San Francisco at 9am"

Input 2: "leave at 9am to San Francisco from Palo Alto"

Using a standard linear compiler, both inputs require two different sets of grammar rules, as compilation occurs in the order that terms are presented. This method is inefficient in that each possible order of terms requires a new rule. Conversely, the number of rules increases for combination of terms allowed. Exemplary rules used by a linear compiler, for these inputs, follow.

Rules for Input 1:
START "to" END
GARBAGE
TIME

Rules for Input 2:
GARBAGE
TIME
"to" END
"from" START where GARBAGE is a rule stating the token can be discarded.

In accordance with the disclosure, the positional constraints are removed, and a cascade of rules is introduced. Accordingly, a single set of rules can process both inputs, as follows.

INPUT→STRING_GROUP "to" STRING_GROUP
STRING_GROUP→STRING_GROUP "from" STRING_GROUP
STRING_GROUP→STRING_GROUP+TIME
GARBAGE It may be seen that Input 1 is first parsed into two STRING_GROUP portions. The first portion is analyzed and is provisionally taken as the start. The second portion matches for a time and returns the time portion and the remaining tokens.

For Input 2, the two STRING_GROUP portions are different. The first portion contains the time and the second portion contains both a start and an end. The second rule is cross matched with the first rule, and the start is confirmed. The remaining location can then be taken as the destination.

While this example is simple, it illustrates the manner in which both inputs generate the same output using one set of rules in a cascade style compiler of the disclosure. The compiler has four rules which can be applied to a plurality of inputs, whereas a standard linear compiler needs seven rules to address the same two inputs. Further, a standard linear compiler must try both sets of rules, resulting in double the compilation processor work, whereas the compiler of the disclosure carries out a single set of rules. Moreover, for each change in input order, a standard linear compiler needs an additional set of rules, and must perform an additional compilation; however, the compiler of the disclosure remains at one set of rules, and carries out a single compilation.

Exemplary Computer System

Figure 4:
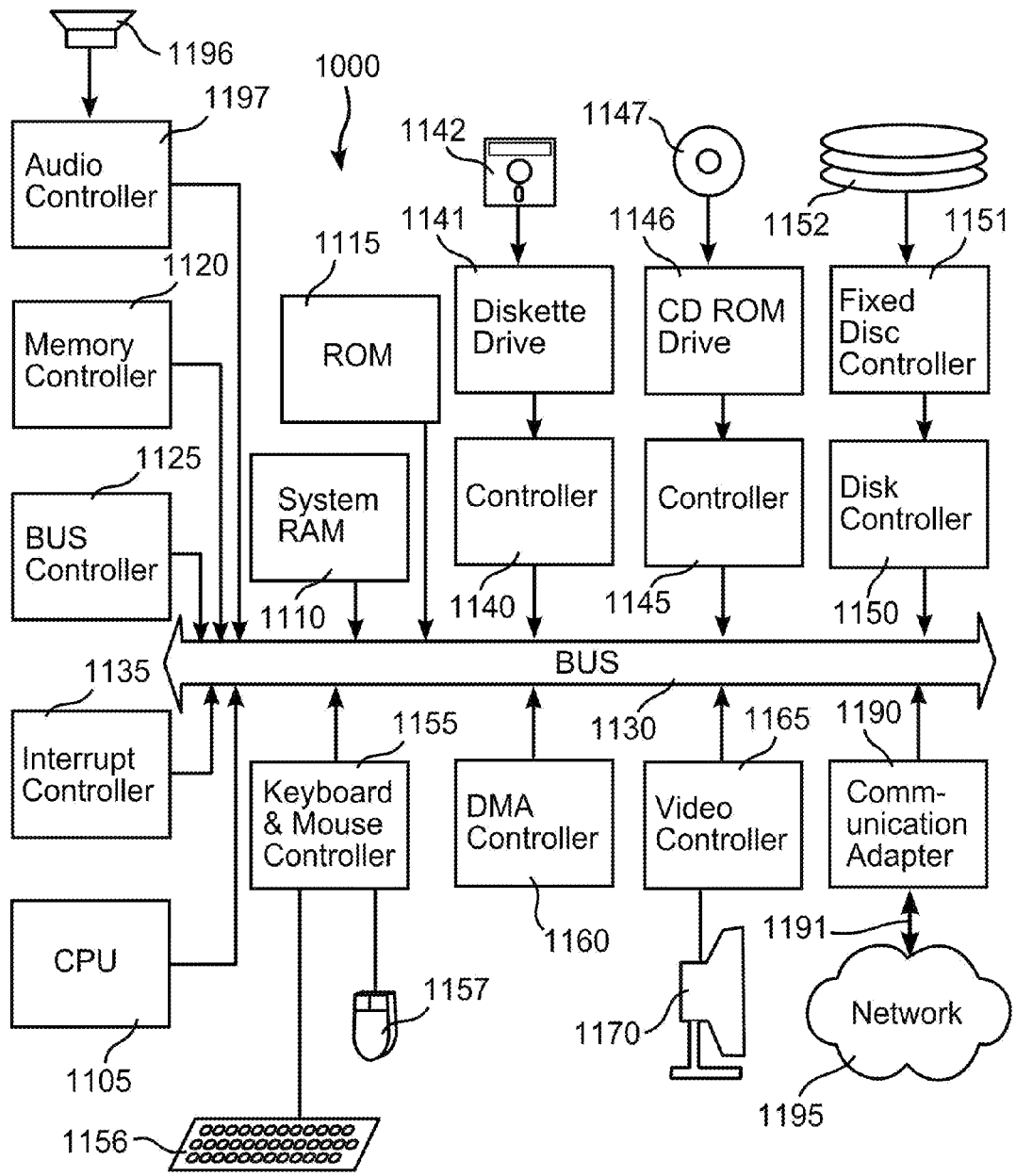
FIG. 4 depicts an illustrative computer system that may be used to carry out the disclosure.

FIG. 4 illustrates the system architecture for a computer system 1000, such as a process controller, or other processor on which or with which the disclosure may be implemented. The exemplary computer system of FIG. 4 is for descriptive purposes only. Although the description may refer to terms commonly used in describing particular computer systems, the description and concepts equally apply to other systems, including systems having architectures dissimilar to FIG. 10. Computer system 1000 can control temperatures, motors, pumps, flow rates, power supplies, ultrasonic energy power generators, and valves, using actuators and transducers. One or more sensors, not shown, provide input to computer system 1000, which executes software stored on non-volatile memory, the software configured to received inputs from sensors or from human interface devices, in calculations for controlling system 200.

Computer system 1000 includes at least one central processing unit (CPU) 1105, or server, which may be implemented with a conventional microprocessor, a random access memory (RAM) 1110 for temporary storage of information, and a read only memory (ROM) 1115 for permanent storage of information. A memory controller 1120 is provided for controlling RAM 1110.

A bus 1130 interconnects the components of computer system 1000. A bus controller 1125 is provided for controlling bus 1130. An interrupt controller 1135 is used for receiving and processing various interrupt signals from the system components. Mass storage may be provided by diskette 1142, CD or DVD ROM 1147, flash or rotating hard disk drive 1152. Data and software, including software 400 of the disclosure, may be exchanged with computer system 1000 via removable media such as diskette 1142 and CD ROM 1147. Diskette 1142 is insertable into diskette drive 1141 which is, in turn, connected to bus 1030 by a controller 11020. Similarly, CD ROM 1147 is insertable into CD ROM drive 1146 which is, in turn, connected to bus 1130 by controller 1145. Hard disk 1152 is part of a fixed disk drive 1151 which is connected to bus 1130 by controller 1150. It should be understood that other storage, peripheral, and computer processing means may be developed in the future, which may advantageously be used with the disclosure.

User input to computer system 1000 may be provided by a number of devices. For example, a keyboard 1156 and mouse 1157 are connected to bus 1130 by controller 1155. An audio transducer 1196, which may act as both a microphone and a speaker, is connected to bus 1130 by audio controller 1197, as illustrated. It will be obvious to those reasonably skilled in the art that other input devices, such as a pen and/or tablet, Personal Digital Assistant (PDA), mobile/cellular phone and other devices, may be connected to bus 1130 and an appropriate controller and software, as required. DMA controller 1160 is provided for performing direct memory access to RAM 1110. A visual display is generated by video controller 1165 which controls video display 1170. Computer system 1000 also includes a communications adapter 1190 which allows the system to be interconnected to a local area network (LAN) or a wide area network (WAN), schematically illustrated by bus 1191 and network 1195.

Operation of computer system 1000 is generally controlled and coordinated by operating system software, such as a Windows system, commercially available from Microsoft Corp., Redmond, Wash. The operating system controls allocation of system resources and performs tasks such as processing scheduling, memory management, networking, and I/O services, among other things. In particular, an operating system resident in system memory and running on CPU 1105 coordinates the operation of the other elements of computer system 1000. The present disclosure may be implemented with any number of commercially available operating systems.

One or more applications, such as an HTML page server, or a commercially available communication application, may execute under the control of the operating system, operable to convey information to a user.

All references cited herein are expressly incorporated by reference in their entirety. It will be appreciated by persons skilled in the art that the present invention is not limited to what has been particularly shown and described herein above. In addition, unless mention was made above to the contrary, it should be noted that all of the accompanying drawings are not to scale. There are many different features to the present invention and it is contemplated that these features may be used together or separately. Thus, the invention should not be limited to any particular combination of features or to a particular application of the invention. Further, it should be understood that variations and modifications within the spirit and scope of the invention might occur to those skilled in the art to which the invention pertains. Accordingly, all expedient modifications readily attainable by one versed in the art from the disclosure set forth herein that are within the scope and spirit of the present invention are to be included as further embodiments of the present invention.

What is claimed is:

1. A system for planning transportation for a passenger along a route from an origin to a destination, comprising:
    at least one computer executing software stored on non-transitory media, the software configured for—
        storing information pertaining to the passenger, including a desired route;
        storing information pertaining to one or more public transportation options which can be used by the passenger to travel along at least a portion of the route along one or more public legs, each public leg having a starting and ending location;
        storing information pertaining to one or more crowdsourced drivers willing to transport the passenger, using a private vehicle, along at least a portion of the route along one or more private legs, each private leg having a starting and ending location;
        using stored public transportation information and information from the crowdsourced drivers to calculate one or more combinations of private legs with public legs, the combination including at least one of (a) one or more private legs beginning at one or more public leg ending locations and (b) one or more private legs ending at one or more public leg starting locations;
        communicating the calculated combinations to the passenger; and
        communicating a location of the passenger to one of the one or more crowdsourced drivers.

2. The system of claim 1, wherein calculating one or more combinations uses the formula $w=nt_p(+^*)(t_m)^x$ where n and x are constant, $x<1$, and $t_p$, $t_m$ are time waiting and time moving, respectively.

3. The system of claim 1, wherein stored information pertaining to the passenger, and information pertaining to drivers, is input using at least one of a web browser and a smartphone application.

4. The system of claim 1, wherein information pertaining to one or more drivers is obtained using crowd-sourcing.

5. The system of claim 1, wherein calculating one or more combinations uses an A* style methodology and heuristics including the formula $w=nt_p(+^*)(t_m)^x$.

6. The system of claim 1, wherein the information pertaining to public transportation options is filtered to select for options having at least one of a relatively shorter distance and a relatively shorter travel time than options not selected.

7. The system of claim 1, wherein calculating is performed using a graph methodology where an original edge, corresponding to a public or private leg, is replaceable, and where the graph remains monotonic, directed, and acyclic when new edges are inserted.

8. The system of claim 1, wherein calculating uses a graph search algorithm to select a first subset of optimal routes using least edges traversed, relative to all possible routes.

9. The system of claim 8, wherein a second subset is selected from the first subset using the graph search algorithm.

10. The system of claim 9, wherein when the second subset is rejected by the passenger, or is suboptimal in accordance with predetermined criteria, the first subset is recalculated using public transportation options not included when calculating the first subset.

11. A method for planning transportation for a passenger along a route from an origin to a destination, comprising:
    using at least one computer executing software stored on non-transitory media, the software configured for—
        storing information pertaining to the passenger, including a desired route provided by the passenger;
        storing information pertaining to one or more public transportation options which can be used by the passenger to travel along at least a portion of the route along one or more public legs, each public leg having a starting and ending location;

storing information pertaining to one or more crowdsourced drivers willing to transport the passenger, using a private vehicle, along at least a portion of the route along one or more private legs, each private leg having a starting and ending location;

using stored public transportation information and information from the crowdsourced drivers to calculate one or more combinations of private legs with public legs, the combination including at least one of (a) one or more private legs beginning at one or more public leg ending locations and (b) one or more private legs ending at one or more public leg starting locations; and communicating the calculated combinations to the passenger.

12. The method of claim 11, wherein when storing information provided by the passenger, the software is further configured for:

accepting spoken words from the passenger, the spoken words provided using a natural language format; and processing the natural language format information to determine the desired route, using a variable context compiler which parses L1 to LN grammars simultaneously, and which uses a sliding window filter and a cascade architecture.

13. The method of claim 12, where the variable context compiler separates the natural language route information into string groups separated by a keyword, and processes each string group separately.

14. The method of claim 12, wherein a rule set of the variable context compiler is configured to analyze a plurality of different grammatical contexts of natural language route information.

15. The method of claim 11, wherein calculating one or more combinations uses the formula $w=nt_p(+*)(t_m)^x$ where n and x are constant, $x<1$, and $t_p$, $t_m$ are time waiting and time moving, respectively.

16. The method of claim 11, wherein stored information pertaining to the passenger, and information pertaining to drivers, is input using at least one of a web browser and a smartphone application.

17. The system of claim 1, wherein calculating one or more combinations uses an A* style methodology and heuristics including the formula $w=nt_p(+*)(t_m)^x$.

18. A system for planning transportation for a passenger along a route from an origin to a destination, comprising:

at least one computer executing software stored on non-transitory media, the software configured for— storing information pertaining to the passenger, including a desired route;

storing information pertaining to one or more public transportation options which can be used by the passenger to travel along at least a portion of the route along one or more public legs, each public leg having a starting and ending location;

storing information pertaining to one or more crowdsourced drivers willing to transport the passenger, using a private vehicle, along at least a portion of the route along one or more private legs, each private leg having a starting and ending location, the information obtained by crowd-sourcing;

using stored public transportation information, and information provided by the crowdsourced drivers, to calculate one or more combinations of private legs with public legs using a graph search algorithm and the heuristic formula $w=nt_p(+*)(t_m)^x$, where n and x are constant, $x<1$, and $t_p$, $t_m$ are time waiting and time moving, respectively, the combination including at least one of (a) one or more private legs beginning at one or more public leg ending locations and (b) one or more private legs ending at one or more public leg starting locations; and communicating the calculated combinations to the passenger.

19. The system of claim 18, wherein crowd-sourcing includes the crowdsourced drivers submitting bids to transport the passenger along one or more of the private legs.

20. The system of claim 18, wherein passengers submit bids to obtain transportation along one or more private legs.

* * * * *